United States Patent
Booij et al.

(10) Patent No.: US 12,055,618 B2
(45) Date of Patent: Aug. 6, 2024

(54) LOCATION DETERMINATION SYSTEM HAVING ROTATING IDENTIFIERS FOR DISTINGUISHING TRANSMITTERS

(71) Applicant: Sonitor Technologies AS, Oslo (NO)

(72) Inventors: Wilfred Edwin Booij, Oslo (NO); Endre Bakka, Oslo (NO); Fritjof Boger Engelhardtsen, Oslo (NO)

(73) Assignee: Sonitor Technologies AS, Oslo (NO)

( * ) Notice: Subject to any disclaimer, the term of this patent is extended or adjusted under 35 U.S.C. 154(b) by 652 days.

(21) Appl. No.: 15/858,690

(22) Filed: Dec. 29, 2017

(65) Prior Publication Data
US 2019/0204403 A1  Jul. 4, 2019

(51) Int. Cl.
*G01S 1/72* (2006.01)
*G01S 5/02* (2010.01)
*H04L 67/52* (2022.01)
*H04W 4/02* (2018.01)

(52) U.S. Cl.
CPC ............. *G01S 1/725* (2013.01); *G01S 1/72* (2013.01); *G01S 5/02585* (2020.05); *H04L 67/52* (2022.05); *H04W 4/02* (2013.01)

(58) Field of Classification Search
None
See application file for complete search history.

(56) References Cited

U.S. PATENT DOCUMENTS

| | | | | |
|---|---|---|---|---|
| 4,602,357 A | * | 7/1986 | Yang | G08B 25/016 |
| | | | | 340/13.28 |
| 4,963,876 A | * | 10/1990 | Sanders | G08C 17/00 |
| | | | | 340/12.55 |

(Continued)

FOREIGN PATENT DOCUMENTS

| EP | 1 022 583 A2 | 7/2000 |
|---|---|---|
| EP | 1 022 583 A3 | 7/2000 |

(Continued)

OTHER PUBLICATIONS

Mayrhofer, Rene, Mike Hazas, and Hans Gellersen. "An authentication protocol using ultrasonic ranging." (2006). (Year: 2006).*

(Continued)

*Primary Examiner* — Yuqing Xiao
*Assistant Examiner* — Jonathan D Armstrong
(74) *Attorney, Agent, or Firm* — Sterne, Kessler, Goldstein & Fox P.L.L.C.

(57) ABSTRACT

The present disclosure relates to a location determination system that includes acoustic transmitting devices and mobile devices. A mobile device receives acoustic signals (e.g., ultrasound signals) from an acoustic transmitting device. The mobile device must be able to identify the acoustic transmitting device with particularity when receiving the acoustic signals. It is more efficient to use a short identifier, for example 6 bits, for this purpose because it requires less power to transmit and decode. By utilizing the rotating identifier system described herein, more acoustic transmitting devices can be distinguished than using a time-invariant identifier would otherwise provide, and the transmissions are more secure and therefore less vulnerable to free-riders.

20 Claims, 4 Drawing Sheets

(56) References Cited

U.S. PATENT DOCUMENTS

| | | | | |
|---|---|---|---|---|
| 5,420,925 | A * | 5/1995 | Michaels | G06F 7/584 380/262 |
| 5,422,715 | A * | 6/1995 | Clarke | G01C 15/002 356/141.3 |
| 5,608,723 | A * | 3/1997 | Felsenstein | H04K 1/00 340/7.24 |
| 5,977,913 | A * | 11/1999 | Christ | G01C 21/206 340/524 |
| 6,616,254 | B1 | 9/2003 | Raphaeli | H04B 1/69 375/135 |
| 7,443,280 | B2 * | 10/2008 | Hetzel | H04L 9/3271 307/10.2 |
| 8,194,856 | B2 * | 6/2012 | Farris | H04W 12/007 380/239 |
| 9,264,151 | B1 | 2/2016 | Emigh | G06Q 30/0211 |
| 10,089,810 | B1 | 10/2018 | Kaye | G07C 9/00309 |
| 10,219,102 | B2 * | 2/2019 | Jang | H04W 64/00 |
| 10,735,398 | B1 | 8/2020 | Covati | H04L 63/0428 |
| 2003/0189530 | A1 * | 10/2003 | Tsui | G08C 19/28 345/48 |
| 2004/0036597 | A1 * | 2/2004 | Mays, Jr. | G08B 21/0202 340/539.1 |
| 2005/0163196 | A1 * | 7/2005 | Currivan | H04L 25/03343 375/144 |
| 2005/0175076 | A1 * | 8/2005 | Miller | H04B 1/71637 375/150 |
| 2006/0050929 | A1 * | 3/2006 | Rast | F41G 3/147 382/103 |
| 2006/0218374 | A1 * | 9/2006 | Ebert | G01S 13/87 712/5 |
| 2008/0055076 | A1 * | 3/2008 | Yu | G08B 1/08 340/539.23 |
| 2008/0055083 | A1 * | 3/2008 | Yu | G08B 1/08 340/571 |
| 2009/0010644 | A1 * | 1/2009 | Varshneya | G01S 17/10 398/33 |
| 2012/0055250 | A1 * | 3/2012 | Hashimoto | G01S 15/104 73/597 |
| 2013/0214909 | A1 * | 8/2013 | Meijers | H04W 4/029 340/10.5 |
| 2013/0217333 | A1 * | 8/2013 | Sprigg | H04W 4/80 455/41.2 |
| 2013/0282438 | A1 * | 10/2013 | Hunter | H04W 4/02 705/7.32 |
| 2014/0073287 | A1 * | 3/2014 | Zhang | H04W 74/00 455/418 |
| 2014/0142805 | A1 * | 5/2014 | Frye | B60R 16/023 701/36 |
| 2014/0280316 | A1 * | 9/2014 | Ganick | H04B 10/1149 707/769 |
| 2015/0261304 | A1 * | 9/2015 | Kamisawa | E05F 15/77 340/5.28 |
| 2015/0301150 | A1 * | 10/2015 | Stuckman | G01S 1/00 342/407 |
| 2015/0345965 | A1 * | 12/2015 | Semsey | H04W 84/12 701/537 |
| 2016/0042602 | A1 * | 2/2016 | Phan | G07F 17/3237 463/29 |
| 2016/0044460 | A1 * | 2/2016 | Cornaby | H04W 4/023 455/456.3 |
| 2016/0078484 | A1 | 3/2016 | Emigh et al. | |
| 2017/0311161 | A1 * | 10/2017 | Kuenzi | H04W 12/08 |
| 2017/0316628 | A1 * | 11/2017 | Farber | E05F 15/668 |
| 2017/0316630 | A1 * | 11/2017 | Zeinstra | G07C 9/00309 |
| 2017/0372574 | A1 * | 12/2017 | Linsky | G08B 13/1966 |
| 2018/0080280 | A1 * | 3/2018 | Bodurka | E06B 9/68 |
| 2019/0222315 | A1 * | 7/2019 | Ganick | G06Q 30/02 |

FOREIGN PATENT DOCUMENTS

| | | |
|---|---|---|
| WO | WO 2013/126747 A2 | 8/2013 |
| WO | WO 2013/126747 A3 | 8/2013 |

OTHER PUBLICATIONS

International Search Report dated Apr. 12, 2019 for Appl. No. PCT/IB2018/060664, 4 pages.
Written Opinion of the International Searching Authority dated Apr. 12, 2019 for Appl. No. PCT/IB2018/060664, 8 pages.

* cited by examiner

LOCATION DETERMINATION SYSTEM HAVING ROTATING IDENTIFIERS FOR DISTINGUISHING TRANSMITTERS

FIELD

The present disclosure relates generally to real-time location systems and more particularly to determining the location of an object or person within a real-time locating system.

BACKGROUND

Modern businesses and organizations face a common challenge in tracking the location of important resources in a building or campus environment. Such resources include key personnel, critical pieces of equipment, vital records, or other useful devices. These resources often relocate throughout the day according to organizational needs, and locating these important resources can prove difficult and time consuming. In order to avoid the inherent productivity loss in devoting time and energy towards manually locating these resources, it is desirable to develop an approach that tracks, catalogues, and reports the location of these important resources in real-time.

SUMMARY

In an embodiment of the present disclosure, a computer-implemented method is described that includes receiving a modulated acoustic signal by a mobile device in a real-time location system in an environment, the modulated acoustic signal having been transmitted by an acoustic transmitting device that is located in the environment. The computer-implemented method also includes detecting, by the mobile device, the modulated acoustic signal to determine an identifier in use at a time period, wherein the detected identifier is a member of a rotating set of identifiers with each identifier in the set of identifiers having the same fixed bit length. The computer-implemented method also includes determining the location of the mobile device based on the detected identifier, the time period, and additionally for large installations, the RF access point to which the mobile device is communicatively coupled.

In a further embodiment of the present disclosure, a computer-implemented method is disclosed that includes determining an identifier of an acoustic transmitting device by a real-time location system in an environment, wherein each of the identifiers is unique to a particular acoustic transmitting device for a particular time period, and each of the identifiers has a same fixed bit length. The computer-implemented method also includes modulating, by the acoustic transmitting device, an acoustic signal with the particular identifier to output a modulated acoustic signal during the particular time period of validity. The computer-implemented method also includes transmitting, by the acoustic transmitting device, the modulated acoustic signal including the identifier to a mobile device located within the environment.

In an embodiment of the present disclosure, a computer-implemented system is described that includes an acoustic transmitting device that is configured to use a rotating set of identifiers in a real-time location system in an environment, wherein each of the identifiers in the rotating sequence of identifiers has a same fixed bit length. The acoustic transmitting device is further configured to modulate an acoustic signal with the identifiers at the particular time period to output a modulated acoustic signal and transmit the modulated acoustic signal to a mobile device located within the environment during the particular time period of validity. The computer-implemented system further includes the mobile device that is configured to receive the modulated acoustic signal, to detect the identifier in the modulated acoustic signal, to determine the location of the mobile device based on the detected identifier, the time period, and additionally for large installations, a rough indication of the neighborhood in which the mobile device is located. The rough indication may be determined by the mobile device based at least in part on a global positioning service (GPS), one or more Wi-Fi signals, one or more Bluetooth signals, one or more cellular signals, one or more positioning sensors implemented within the mobile device (e.g. inertial measurement unit(s), gyroscope(s), accelerometer(s), magnetometer(s), etc.), one or more pressure sensors implemented within the mobile device, one or more cameras implemented within the mobile device, and/or other suitable manner.

BRIEF DESCRIPTION OF THE DRAWINGS

The accompanying drawings, which are incorporated herein and form a part of the specification, illustrate embodiments of the present disclosure and, together with the description, further explain the principles of the disclosure and enable a person skilled in the pertinent arts to make and use the embodiments.

Figure 1:
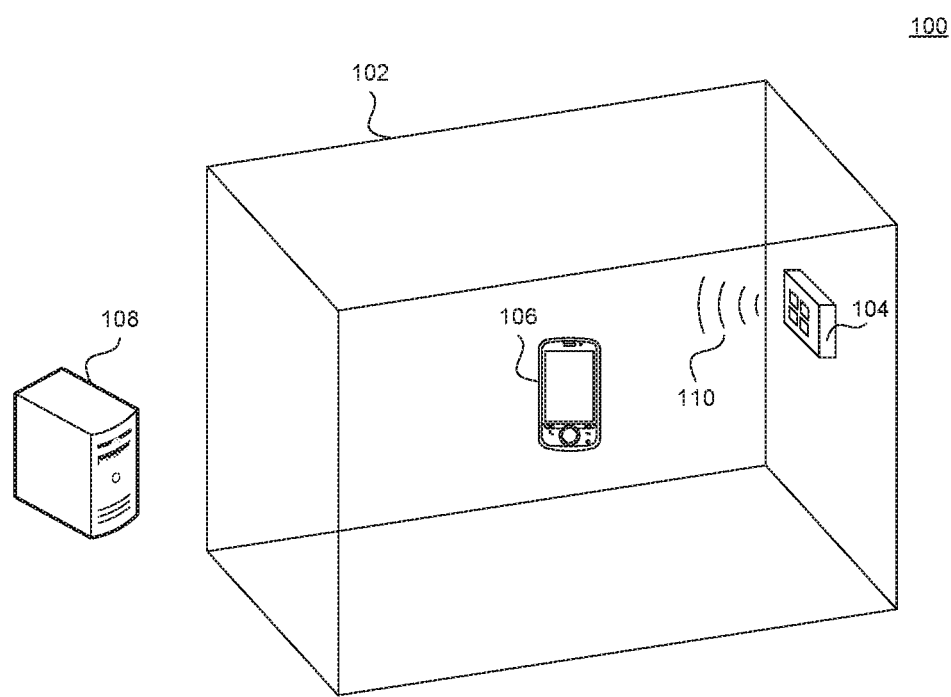
FIG. 1 illustrates a perspective representation of a real-time location system according to example embodiments of the present disclosure.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant arts will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed Description does not limit the disclosure. Rather, only the below claims and their equivalents define the scope of the disclosure.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that the actions result from computing devices, processors, controllers, or other devices executing the firmware, software, routines, and/or instructions.

Any reference to the term "module" shall be understood to include at least one of software, firmware, and hardware (such as one or more circuit, microchip, or device, or any combination thereof), and any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will fully reveal the general nature of the disclosure so that others can, by applying knowledge of those skilled in relevant arts, readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant arts in light of the teachings herein.

The present disclosure provides a real-time location system that tracks accurate location information of objects and persons. Real-time location systems operate with different levels of accuracy depending on available system infrastructure. In some embodiments, room-level accuracy of location information is sufficient whereas other use cases require 1D, 2D or even 3D resolution of position within a room. In some embodiments, a system provides three-dimensional location information about persons or equipment in real-time. A real-time location system can include a network of acoustic transmitting devices attached to interior surfaces in an environment and mobile devices attached to moveable objects or people. The mobile devices receive signals from the acoustic transmitting devices to determine descriptive location information or three-dimensional locational coordinates within the environment. Acoustics, e.g., ultrasound, is well-suited for this purpose because it travels slower than radio waves and generally goes unnoticed by humans. Acoustic waves also attenuate more rapidly and do not penetrate walls, which avoids signal interference between rooms. If the location of the acoustic transmitting device is known, then the location of the mobile device is in the near vicinity of the location of the particular acoustic transmitting device whose signals have been received. For example, if a particular acoustic transmitting device has been installed in a closed room and a mobile device receives the acoustic signal from the particular acoustic transmitting device, then the mobile device is located within the closed room. Acoustic signals are also easier to process when measuring a relatively short distance, as exists between the acoustic transmitting devices and the mobile devices described herein.

However, this approach presents unique challenges. The mobile devices need to have a particularized way of identifying the acoustic transmitting device that is the source of a modulated acoustic signal (modulated to carry information). Thus, the system assigns each acoustic transmitting device a unique identifier comprising a fixed number of bits. Limiting the identifiers to be as short as possible, e.g., 6 bits, provides efficiency advantages because a shorter identifier requires less power to be transmitted and less processing to detect. However, this approach limits the number of unique identifiers available. For instance, if an embodiment uses 6 bits for the identifiers, only 64 ($2^6$) unique identifiers exist. In an exemplary installation, the number of acoustic transmitting devices may be much higher than 64, and thus, mobile devices need an alternative means or ancillary means of identifying an acoustic transmitting device.

Therefore, a need exists for real-time location systems utilizing the rotating identifier system described herein in order to enhance security by preventing intrusive, malicious, or careless software or hardware devices from spoofing the system or exploiting, disturbing, or taking advantage of the system infrastructure.

Real-Time Location Systems

Real-time location systems have been developed using various wireless protocols with perhaps the best known system being the global positioning system (GPS). While such location systems provide horizontal location accuracies on the order of approximately 8 meters, these systems do not solve all location-tracking scenarios. For example, many scenarios require location accuracies of less than 0.3 meters. Other scenarios require the ability to distinguish between floors in a high-rise building. Still other scenarios necessitate contextual location information, such as room-based information in an office building.

Embodiments of the present disclosure provide solutions to these augmented location requirements. Acoustic signals may be used to determine the location of mobile devices, attached to persons or objects, by transmitting acoustic signals from acoustic transmitting devices, which may be fixed to the walls or ceilings of a building. In a further exemplary embodiment, the acoustic signals include identifiers (including encoded identifiers) assigned to their respective acoustic transmitting device. The mobile devices detect or decode the identifying information in the acoustic signals. If the location of the acoustic transmitting device is known, then the location of the mobile device is in the vicinity of the location of the particular acoustic transmitting device whose signals have been received. For example, if a particular acoustic transmitting device has been installed in a closed room and a mobile device receives the acoustic signal from the particular acoustic transmitting device, then the mobile device is located within the closed room. Therefore, if each of the acoustic transmitting devices emits a unique identifying signal and the location of each acoustic transmitting device is known, then the location of a mobile device may be determined upon its receipt of an acoustic signal from a particular acoustic transmitting device and its associated identity. Similarly, if a mobile device receives acoustic signals from each of two separately identifiable acoustic transmitting devices, then the mobile device is located in the vicinity of both of the two separately identifiable acoustic transmitting devices. For example, were the two separately identifiable acoustic transmitting devices placed at the two opposite ends of a corridor, then a mobile device situated in the corridor would likely receive signals from the two separately identifiable acoustic transmitting devices, and the location of the mobile device would be established. In other embodiments, more precise locations of a mobile device may be established. For example, arrival times of acoustic signals at a mobile device can be used to find the location of the mobile device in the environment, using standard geometric calculations.

In an embodiment, the acoustic signals may also include data associated with the environment near the acoustic transmitting device such as one or more rooms, spaces, structures, buildings, regions, etc. in which the acoustic transmitting device resides. More particularly, such environmental data can include specific details associated with the environment. For instance, the environmental data can indicate the respective room, building, campus, area, etc. where the acoustic transmitting device is located. The environmental data can further include data specifying an organization, configuration, or hierarchy of the environment in which the acoustic transmitting device is located. For instance, such environmental data can include data specifying a relationship between a particular room and a particular building (e.g., a location of the room within the building).

The environmental data can further include dimensional data associated with the environment. For instance, dimensional data can include the dimensions of one or more reflective surfaces (e.g. walls, ceilings, floors, objects, furniture, etc.) within a room in which a transmitting device is located. The dimensional data can further include data indicative of the normal direction of the reflective surfaces. The environmental data can further include data indicative of the acoustic attenuation of such reflective surfaces. The environmental data can further include data indicative of the relative locations of the acoustic transmitting devices within a particular room, building, area, etc. More particularly, such environmental data can include an identifier of a surface (e.g. wall, floor, ceiling, etc. of a room) on which a transmitting device is located and/or data indicative of a location and/or orientation of the transmitting device with respect to the surface. The environmental data can further include atmospheric data indicative of the speed of sound, temperature, pressure, humidity, etc. within the environment. In certain embodiments, since the environmental data changes over time, the environmental data updates frequently to reflect current environmental conditions.

The acoustic transmitting devices of the real-time location system can be configured to periodically transmit acoustic signals (or other suitable signals, such as radio frequency signals) to be received by mobile devices located within broadcast range of the transmitting devices. In some implementations, the acoustic signals can be ultrasonic signals having a frequency of about 20 kHz or greater. In a particular embodiment of the present disclosure, the acoustic signals can be ultrasonic signals having a frequency of about 20 kHz. In another particular embodiment of the present disclosure, the acoustic signals can be ultrasonic signals having a frequency of about 40 kHz. As used herein, the term "about," when used in reference to a numerical value, refers to within 30% of that value.

In this manner, a mobile device within the broadcast range of the acoustic transmitting devices picks up acoustic signals. The acoustic signals can be signals propagating directly from the acoustic transmitting devices to the mobile devices (referred to herein as "direct signals") and/or signals reflected by one or more reflective surfaces (referred to herein as "reflected signals"). The reflective surfaces can act as acoustic mirrors capable of reflecting acoustic signals (with some attenuation) and can include walls, ceilings, floors, furniture, objects, etc. located within the environment. The precise location of a mobile device can be determined based at least in part on the acoustic signals received from the acoustic transmitting devices. In some implementations, contextual or descriptive location information may be provided, e.g., room number or floor number in an office building.

A mobile device must appropriately identify the source of the acoustic signals being received, i.e., the identifier of the acoustic transmitting device that is transmitting the acoustic signals. Minimizing the digital size of the identifiers, e.g., to 6 bits, provides efficiency advantages because a shorter identifier (fewer number of bits) requires less power to be transmitted and less processing to detect. However, this approach limits the number of unique identifiers available. For instance, if an embodiment of the identifiers uses 6 bits, only 64 (2^6) unique identifiers are available. In an exemplary installation of a real-time location system, the number of acoustic transmitting devices may be much higher than 64, and thus, mobile devices need an alternative means of identifying, or an ancillary means of identifying, an acoustic transmitting device.

To overcome the limitations of the fixed number of bits for an identifier, each acoustic transmitting device transmits a modulated acoustic signal carrying an identifier that changes (or rotates) over time in a manner that is known to the relevant components in the real-time location system. In this approach, a unique identifier is used for a particular time period, and then at the end of this time period, a second (different) unique identifier is used for a subsequent time period. Continuing in this manner, a sequence of identifiers is used by each acoustic transmitting device, where each identifier in the sequence is used for a pre-defined time period, and then replaced in the next time period with another identifier in the sequence. The pre-defined time periods are known by components in the real-time location system, with these components being time synchronized to a universal time in the real-time location system. In an embodiment, a mobile device receives the modulated acoustic signals from an acoustic transmitting device, detects the identifier in the modulated acoustic signals, and uses the combination of the detected identifier together with the time period when the detected identifier is used to determine the particular acoustic transmitting device that transmitted the modulated acoustic signals. By determining the particular acoustic transmitting device, the location of the mobile device that receives the modulated acoustic signals from the particular acoustic transmitting device is also determined (i.e., in the immediate vicinity of the particular acoustic transmitting device.). In an alternate embodiment, the mobile device passes on the detected identifier to a remote processing server (e.g., central server) via a wireless network connection, a Local-Area Network (LAN), a Wide-Area Network (WAN), or other communication network or protocol. In this embodiment, the central server determines the particular acoustic transmitting device whose acoustic signal was received by the mobile device by processing the combination of the detected identifier together with the time period when the detected identifier is used to make the determination of the particular acoustic transmitting device. Since the location of each acoustic transmitting device is known, the location of a mobile device may be ascertained by using the combination of the detected identifier in combination with the time period in which the detected identifier is in use. In certain embodiments, a lower limit on this time period may be determined to be about 60 milliseconds. The 60 millisecond value is based on the maximum acoustic range of 20 meters, a maximum that is set by acoustic attenuation such that signals beyond this range are below the noise level in a typical environment.

In scenarios where a real-time location system is desired to cover a very large environment, a rotating set of identifiers may not provide the uniqueness required across the entire environment. In other words, at any given time period, a particular identifier may be in use by more than one acoustic transmitting device, when a large number (e.g., hundreds) of acoustic transmitting devices are in use. To address such situations, the lack of uniqueness of the identifiers of acoustic transmitting devices in any given time period may be resolved by using a rough indication of the neighborhood in which the particular acoustic transmitting device and mobile device are located. The rough indication may be determined by the mobile device based at least in part on a global positioning service (GPS), one or more Wi-Fi signals, one or more Bluetooth signals, one or more cellular signals, one or more positioning sensors implemented within the mobile device (e.g. inertial measurement unit(s), gyroscope(s), accelerometer(s), magnetometer(s), etc.), one or more pressure sensors implemented within the mobile device, one or more cameras implemented within the mobile device, and/or other suitable manner. Consequently, whether the mobile device itself, or a central server, performs the processing to determine the location of the mobile device, the mobile device/central server can use the combination of three pieces of information: the detected identifier of an acoustic transmitting device whose acoustic signals have been received, the time period when the detected identifier was in use, and the RF access point in use by the mobile device to uniquely determine the acoustic transmitting device (and therefore the location of mobile device).

The systems and methods of the present disclosure can be used in a number of applications including, for example, location tracking, work flow, mobile equipment tracking, safety and compliance, mobile equipment management, staff location determination, or other suitable applications. One example field of use is within the health care industry. In an embodiment, a hospital implements a real-time location tracking system of the present disclosure to provide patient tracking, patient flow, asset management, environmental monitoring, etc.

FIG. 1 is a perspective representation of location determination system 100. Location determination system 100 can be a real-time location system in an environment that determines the location of a moveable object or person. Placed within environment 102, location determination system 100 can include acoustic transmitting device 104, mobile device 106, remote processing server 108, and modulated acoustic signals 110. These components cooperate to provide a location system capable of estimating a location of mobile device 106 within environment 102. In certain embodiments, location information may be three-dimensional location information. In some embodiments, location determination system 100 includes more than one instance of acoustic transmitting device 104 installed throughout a building or series of rooms, and more than one instance of mobile device 106 attached to, or incorporated into/onto, people, machines, animals, vehicles, robots, stock, equipment, or other objects. Environment 102 can consist of rooms in a building such as, for example, a ward in a hospital, an office in an office building, or a storage space in a warehouse. More than one instance of environment 102 can exist and include more than one instance of acoustic transmitting device 104. When several instances of environment 102 serve one location, building, or complex, these instances of environment 102 can be incorporated into clusters, groups, or management entities. In an alternate embodiment, environment 102 comprises a single room.

Acoustic transmitting device 104 includes an acoustical device, such as an ultrasonic transmitter, and processing logic to transmit modulated acoustic signals 110. Modulated acoustic signals 110 transmitted by acoustic transmitting device 104 communicate an identifier that is unique to a specific instance of acoustic transmitting device 104 at a particular time period. The identifier may be a number in a pseudo-random sequence or be an identifier in a pre-defined table of identifiers. The provision of the identifier is made known to both the acoustic transmitting device 140 that transmits the identifier, as well as the mobile device (or central server) that correlates the detected identifier with the particular acoustic transmitting device 140 that uses the detected identifier at a particular time period. These particular time periods are governed by a system-wide acoustic transmission schedule that requires that acoustic transmitting device 104 and the mobile device are active at the same time, and inactive at the same time. Such coordination maximizes the battery life of devices by synchronization of the timing of transmitting/receiving the identifiers necessary for location determination. In an embodiment, acoustic transmitting device 104 modulates/encodes the identifier on an ultrasonic carrier having an ultrasonic frequency such as, for example, about 20 kHz, 40 kHz, or any other suitable ultrasonic frequencies. As described above, location determination system 100 can include more than one instance of acoustic transmitting device 104, and each acoustic transmitting device 104 can be configured to transmit modulated acoustic signals 110 containing an identifier unique to each particular instance of acoustic transmitting device 104. As noted above for scenarios where a real-time location system is desired to cover a very large environment, an identifier at any given time period may not be unique. In other words, at a particular time period, a particular identifier may be in use by more than one acoustic transmitting device, when a large number (e.g., hundreds) of acoustic transmitting devices are in use. To address such situations, a combination of three pieces of information: the detected identifier of an acoustic transmitting device whose acoustic signals have been received, the time period when the detected identifier was in use, and the RF access point in use by the mobile device is used to uniquely determine the acoustic transmitting device (and therefore the location of the mobile device).

Mobile device 106 includes a microphone capable of receiving modulated acoustic signals 110 from acoustic transmitting device 104, and may include as well as a processing unit to sample, decode, detect and process any received modulated acoustic signals 110. Mobile device 106 resides inside environment 102. Mobile device 106 may be a portable device, and may be attached to a person or item of equipment. In some embodiments, mobile device 106 includes devices such as, for example, a cell phone, an acoustic transducer, an ultrasound transducer, an acoustic tag, an ultrasound tag, and/or any other suitable devices.

In some embodiments, mobile device 106 does not perform processing using its own processing unit (or does not have a processing unit), but offloads the processing to a remote computer such as remote processing server 108 by transmitting relevant data to remote processing server 108 using one or more appropriate communication channels, e.g., acoustic, ultrasound or radio frequencies. Mobile device 106 and/or acoustic transmitting device 104 include a wired or wireless transmitter, such as a radio transmitter, for transmitting information relevant to real-time location determination. In some embodiments, mobile device 106 communicates with remote processing server 108 via radio frequencies, a Local-Area Network (LAN), a Wide-Area Network (WAN), or other communication network or protocol.

Remote processing server 108 (e.g., central server) consists of one or more servers processing real-time location data constituting, for example, identities of mobile devices and acoustic transmitting devices, locations of acoustic transmitting devices, RF access points, etc. Remote processing server 108 employs standard communication modules (e.g., RF, wireline) to listen for, process, and respond to incoming signals. Remote processing server 108 includes processes to perform operations and calculations and radio frequency modules to transmit signals back to acoustic transmitting device 104 and mobile device 106. In an alternate embodiment, remote processing server 108 communicates to acoustic transmitting device 104 and mobile device 106 via a LAN, WAN, or other wireless/wired communication network.

Remote processing server 108 includes a database, which stores information about acoustic transmitting device 104 and mobile device 106 and tracks locations in real-time. In an embodiment, the database may be any commercially available database management system such as Microsoft Access, Microsoft SQL server, an Oracle database, an IBM database, etc. The database maintains communicative connections to the processing elements via traditional networking infrastructure such as routers, switches, hubs, firewalls, etc. In an embodiment, the database may be situated in one computer workstation. Remote processing server 108 implements a centralized storage area network, network-attached storage, redundant array of independent disks, and/or any other configuration of storage devices to supply sufficient storage capacity to archive the full panoply of locational information. Sufficient storage alternatively exists in any other physically attached magnetic storage, cloud storage, or any additional storage medium. In an embodiment, remote processing server 108 deploys a commonly utilized harddisk interface, such as ATA, SATA, SCSI, SAS, and/or fibre for interfacing with a storage medium.

Modulated acoustic signals 110 include an assemblage of signals transmitted from acoustic transmitting devices 104 that propagate within environment 102. In an embodiment, modulated acoustic signals 110 fall in the ultrasonic range, i.e., 20 kHz up to 1 MHz and beyond. Specific embodiments include modulated acoustic signals at 20 kHz, and at 40 kHz. Location determination system 100 modulates, encodes, identifies, and detects/decodes modulated acoustic signals 110 in order to differentiate among various signals and determine locations.

Modulated acoustic signals 110 can include data descriptive of characteristics of the acoustic signals including, for example, a sound pressure level, signal coding type, signal identification, signal direction normal, signal spatial distribution, signal period, and/or other suitable data. Modulated acoustic signals 110 can further include data associated with an environment covered by location determination system 100. Such environmental data can include a layout or organizational hierarchy of the environment, identifying data of the location within the environment (e.g. room, area, space, region, building, etc.) in which acoustic transmitting device 104 sits, dimensional specifications of one or more reflective surfaces (e.g. walls, ceilings, floors, objects, etc.) within the environment (e.g. within a room, area, region, etc. in which acoustic transmitting device 104 is located), data indicative of the relative location of acoustic transmitting device 104 within the environment, such as an identifier of the surface on which acoustic transmitting device 104 is located and/or a location and/or orientation of acoustic transmitting device 104 with respect to the surface. The environmental data can further include atmospheric data indicative of the speed of sound, temperature, pressure, humidity, etc. within the environment. In certain embodiments, because the environmental data changes over time, the environmental data may be frequently updated to reflect current environmental conditions.

Modulated acoustic signals 110 include an identifier that is used by acoustic transmitting device 104 for a particular time period, before changing (rotating) to a new identifier for the subsequent time period. In an embodiment, mobile device 106 receives modulated acoustic signals 110 and detects (detection can include decoding, demodulation or other signal processing to recover the transmitted identifier) the identifier of acoustic transmitting device 104 that transmitted those modulated acoustic signals 110. From the identifier, mobile device 106 may determine the identity of the specific acoustic transmitting device 104 by knowledge of which acoustic transmitting devices 104 were using that particular identifier at the particular time period. If acoustic transmitting device 104 uses a pseudo-random number generator to generate the identifier, then mobile device 106 would use the same pseudo-random number generator to "reverse" the process, and thereby translate the detected identifier into the identity of the acoustic transmitting device 104 that transmitted the identifier. Similarly, if acoustic transmitting device 104 uses a pre-defined table of identifiers for use in the successive time periods, then mobile device 106 would use the same pre-defined table of identifiers to "reverse" the process, and thereby translate the detected identifier into the identity of the acoustic transmitting device 104 that transmitted the identifier. In an alternate embodiment, remote processing server 108 performs the translation processing. In this alternate embodiment, mobile device 106 forwards the detected identifier to remote processing server 108 via a wireless network connection, a Local-Area Network (LAN), a Wide-Area Network (WAN), or other communication network or protocol. In this embodiment, remote processing server 108 performs the processing and determines the identity of acoustic transmitting device 104. In large installations, the RF access point to which the mobile device is communicatively coupled is additionally used for the determination of the identity of acoustic transmitting device 104.

Determining the Identity of an Acoustic Transmitting Device

As noted above with respect to efficiency, limiting the identifiers of the acoustic transmitting devices to be as short as possible, e.g., a p-digit identifier limited to p=6 bits, is advantageous because shorter identifiers require less power to be transmitted and less processing resources to detect. However, shortening the identifiers in this fashion limits the number of unique identifiers available in the system. For instance, if an embodiment uses 6 bits for the identifiers, only 64 (2^6) unique identifiers exist. This presents a challenge because in an exemplary installation, more than 64 instances of acoustic transmitting device 104 may exist. It is desirable to use an identifier system that retains the efficiency advantages of using shorter identifiers while allowing more than 64 (or 2^x, where x is the number of bits configured in that embodiment) instances of acoustic transmitting device 104 to coexist. Furthermore, it is desirable that unauthorized people are not able to map out the real-time location system infrastructure for purposes of offering a separate location service while not having to foot the expense of building the real-time location system infrastructure. Thus, for example, a group of acoustic transmitting devices 104 that use fixed (i.e., time-invariant) identifiers are vulnerable to third-party exploitation. For example, a group of three transmitting devices 104 that uses the time-invariant identifiers 5, 53 and 28 could be readily ascertained by a third party. By taking this readily ascertained information, a third party could then take this mapping information and provide a real-time location system without funding the cost of the underlying infrastructure. Thus, in addition to needing more than 64 (or 2^x, where x is the number of bits configured in that embodiment) instances of acoustic transmitting device 104 to coexist, it is desirable that an approach be provided that thwarts any attempt to map the underlying infrastructure by an unauthorized party.

In embodiments of the present disclosure, a rotational identifier system is described that overcomes the challenges of short length identifiers. Instead of a time-invariant single short-length integer that serves as an identifier for a given acoustic transmitting device 104, embodiments describe the use of changing (or rotating) short-length integers that serve to identify an acoustic transmitting device 104 at successive time periods. For example, the identifier for acoustic transmitting device 104 may be "7" for a time period. In a subsequent time period, the same acoustic transmitting device 104 may identify itself as "63" for this subsequent time period.

In further embodiments, acoustic transmitting device 104 may transmit the p-digit identifier for a predetermined time period, and then transmit a different p-digit identifier for a subsequent time period. In an exemplary embodiment, acoustic transmitting device 104 may repeat the transmission of the p-digit identifier every one second during each time period, where a time period may be one minute. In various embodiments, the time period may be in the range of 3 seconds to 300 seconds. As one of ordinary skill in the art would recognize, this range is merely exemplary and not limiting. By repeatedly transmitting the p-digit identifier during each time period, mobile devices 106 are provided with multiple opportunities to receive the transmitted p-digit identifier. To reduce the overlap of the transmissions of two or more acoustic transmitting devices 104, each acoustic transmission device 104 may be assigned a time slot of transmission that differs from its neighboring acoustic transmitting device(s). For example, in an exemplary identity transmission scheme where each acoustic transmitting device 104 repeats its identifier transmissions every second, each second may be divided up into a number of time slots. In a particular example, a one second timeframe may be broken up into 15 time slots, where one acoustic transmitting device 104 may transmit its acoustic signals in the first time slot, while a neighboring acoustic transmitting device 104 transmits its acoustic signals in the second time slot. As noted above, these acoustic signal transmissions are repeated in each subsequent one second timeframe within the time period during which the assigned identifiers are valid. For the next time period, different identifiers are used for each acoustic transmitting device 104. For example, if each time period is one minute, acoustic transmitting devices 104 repeatedly transmit their identifiers every one second in their assigned time slot, and that change (rotate) at the end of their one minute time periods to the new set of identifiers. These time periods are known by components in the real-time location system, with these components being time synchronized to a universal time in the real-time location system.

In an alternative embodiment, the identifier may be a sequence of fixed-bit codes, where the code changes upon every transmit in accordance with a pseudo random sequence. The pseudo random sequence is generated by a pseudo random generator using a seed as input. To determine the identity of the acoustic transmitting device 104, The mobile device would then have to receive several transmitted codes before the underlying pseudo random seed can be uniquely identified, and thereby associated with transmitter location based on the constraints set by the time period and approximate location of the mobile device. In this embodiment, the identifier is then effectively the pseudo random seed. This approach would be computationally difficult at start-up, since it requires finding a unique seed based only on the approximate location of the mobile device. However, for identification of subsequent acoustic transmitting devices, the process is easier since the second location determined from acoustic positioning constrains the number of seeds that need to be considered to be those of its nearest neighbors.

As the above discussion notes, the scalability challenge of short bit integer identifiers may be overcome by using a rotation (sequence) of short bit integer identifiers, where the particular identifier during a particular time period provides the required unique identification. In some embodiments, security is also a requirement to be addressed. Security requirements typically generate a need that acoustic transmitting devices 104 conceal their transmission of their identities such that only pre-configured equipment (such as mobile devices) may be able to properly detect the identity information. Absent such security measures, unapproved equipment may improperly "free ride" on the infrastructure provided by someone else. To address these security/free-riding concerns, an acoustic transmitting device 104 may transmit a rotating sequence of identifiers that is randomly generated for that device. By randomly generated, it is meant that a third party that observes the identifier at a particular timeframe cannot determine what the observed identifier would be from the same acoustic transmitting device 104 at a later point in time. Approaches to the randomly generated sequence include the generation of a pre-determined sequence, the generation of a pseudorandom sequence, and a completely random sequence. Both the pre-determined sequence and the completely random sequence require that these sequences be shared with the transmitting device and the receiving/detecting device. A pseudo-random sequence that uses a seed for its generation would require that the seed be shared with the transmitting device and the receiving/detecting device. Where a server is employed, the server may provide the processing required under either the generation or the detecting aspects, and the acoustic transmitting device 104 and/or mobile devices 106 may then be more simply implemented.

One approach to an implementation of the above methodology is for a server (e.g., remote processing server 108) to manage the acoustic transmitting devices 104 and mobile devices 106 in accordance with the desired randomization identification procedure. For example, a server (e.g., remote processing server 108) determines a number of seeds that are valid for a period of time that begins at a particular time instant. In such an embodiment, a server maintains a universal time and forwards a set of seeds to the acoustic transmitting devices 104 and mobile devices 106 that are to be used for a number of successive time periods $t_1$, $t_2$, $t_3$, $t_4$, $t_5$, $t_6$, etc. For each acoustic transmitting device 104, a respective identifier is determined using its respective seed and the respective identifier is valid for time period $t_1$. The respective identifiers would be forwarded to the location processing component, i.e., the mobile devices 106 or remote processing server 108. When the period of time $t_1$ completes, a new period of time $t_2$ begins and the next identifier is determined for each acoustic transmitting device 104. This sequential process continues for successive periods of time $t_3$, $t_4$, $t_5$, etc. In an embodiment, during a reset, a new set of seeds would be forwarded to the transmitting devices 104 and mobile devices 106 for use in determining the identifiers following the reset.

Figure 2:
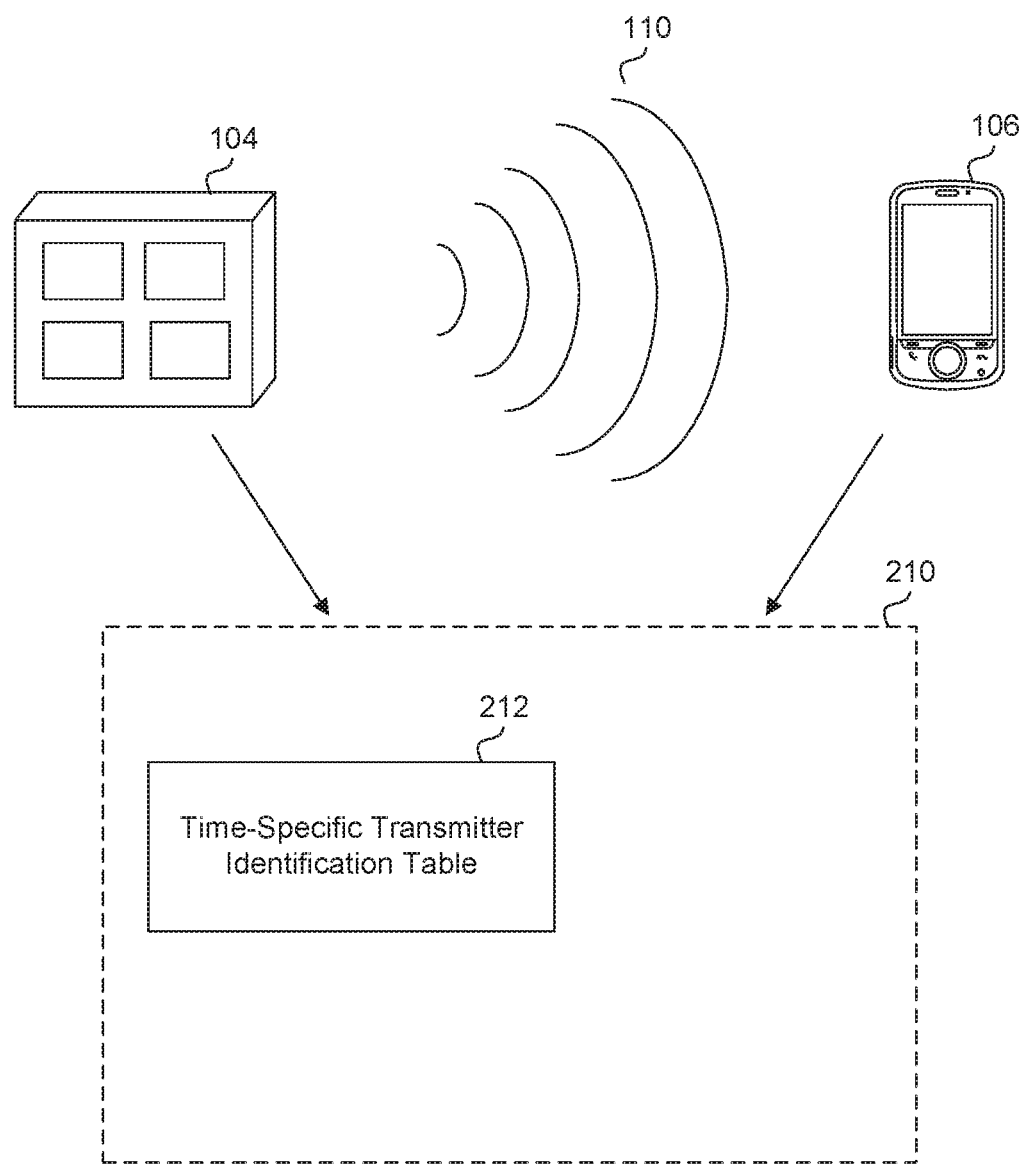
FIG. 2 illustrates a block diagram of an exemplary rotating identifier system as used in a real-time location system according to example embodiments of the present disclosure.

FIG. 2 depicts rotating identifier system 200, according to embodiments of the present disclosure. Rotating identifier system 200 includes identifier management center 210 and one or more instances of acoustic transmitting device 104, mobile device 106, and modulated acoustic signals 110 from FIG. 1. In an embodiment, rotating identifier system 200 organizes one or more instances of acoustic transmitting device 104 into groups or clusters. The groups or clusters may track footprints of various RF access points, and thereby provide for additional identification of acoustic transmitting devices in large facilities having hundreds of acoustic transmitting devices. Rotating identifier system 200 provides a method to synchronize identifiers among one or more instance of acoustic transmitting device 104 and one or more instances of mobile device 106. Rotating identifier system 200 provides several advantages, including increased efficiency and enhanced security.

For security, rotating identifier system 200 ensures that intrusive, malicious, or careless software or hardware devices or programs cannot exploit, disturb, take advantage of, or otherwise interact with identifier management center 210 and the devices of location determination system 100. Furthermore, rotating identifier system 200 prevents outside parties from utilizing the infrastructure installed in an environment for location determination system 100 for alternative purposes or aims. Because malicious entities or free-riders are not privy to rotating identifier system 200 as described in this embodiment, rotating identifier system 200 remains safe from foreign interactions, interruptions, free-riders, or intrusions.

Identifier management center 210 includes random number generator 211, seed value 212, and pre-defined sequence table 213. Identifier management center 210 stores and manages the rotating identifiers and transmits requisite information to acoustic transmitting device 104 and mobile device 106. In an alternate embodiment, identifier management center 210 exists in a distributed architecture across acoustic transmitting device 104 and mobile device 106. Identifier management center 210 communicates to devices in location determination system 100 using radio frequencies or through a standard wireless or wired protocol (e.g., Bluetooth, WLAN, etc.). Such communication can be encrypted using industry standard methods such as public/private key encryption. Identifier management center 210 tracks the identifiers that are associated with each acoustic transmitting device 104, and valid at particular time periods. Identifier management center 210 may further track seeds for random number generators, random number generation algorithms, timestamps associated with time periods, time slots for transmission of identifiers, and relationships between entities in location determination system 100.

Random number generator 211 generates and/or stores and retrieves a sequence of pseudorandom numbers for use by identifier management center 210 in determining the identity of acoustic transmitting device 104. Each of the numbers is valid for a particular time period. As one skilled in the art will understand, the generation of random numbers can be accomplished numerous ways including, for example, pseudorandom number generation, linear congruential generation, multiplicative congruential generation, etc.

In embodiments, seed value 212 may be used for the random number generation, and would be known among acoustic transmitting device 104 and mobile device 106. Thus, all members of rotating identifier system 200 can possess coordinated, time-synchronized random number generation systems. In an alternate embodiment, random number generator 211 resides in remove processing server 108 and is shared between rotating identifier system 200, acoustic transmitting device 104, and mobile device 106.

Pre-defined sequence table 213 stores a representation of the available sequences of identifiers as derived from the number of bits devoted for the acoustic identifier, where each identifier in the sequence is valid for a particular time period. Pre-defined sequence table 213 is a pre-defined table storing sequences of identifiers. In an embodiment, pre-defined sequence table 213 stores the sequences of identifiers in a database table, which can be housed in any commercially available database management system such as Microsoft Access, Microsoft SQL server, an Oracle database, an IBM database, etc. In an alternate embodiment, sequence table 213 is not actually stored but is a logical construction based on the number of bits used and exists only in RAM or at runtime.

Figure 3:
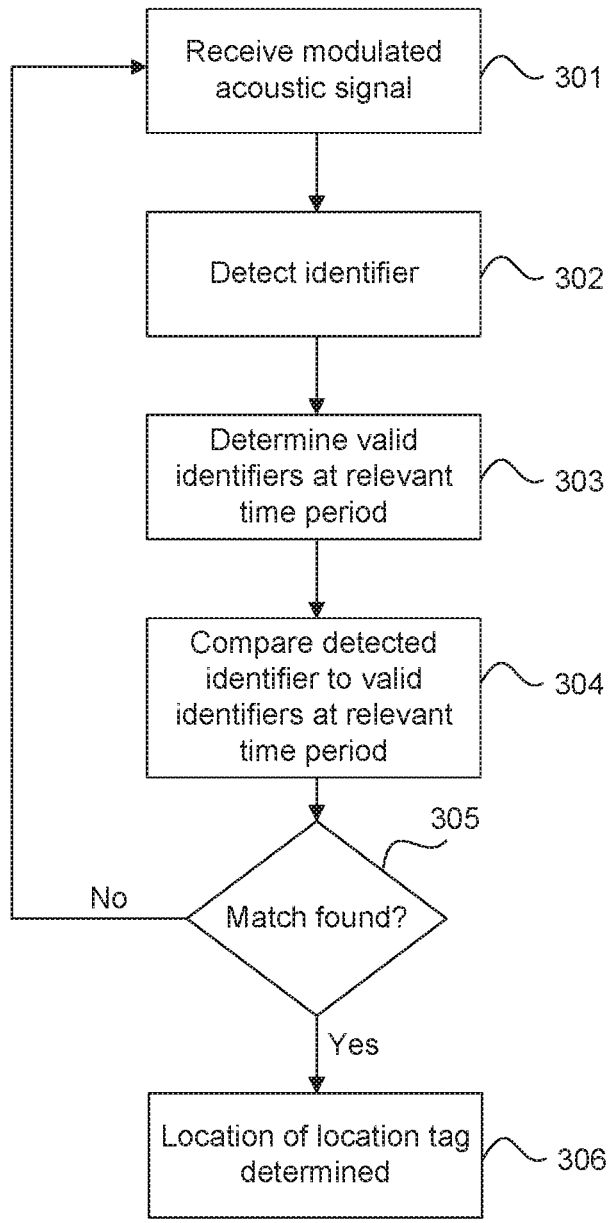
FIG. 3 illustrates a flowchart diagram of a method of identifying an acoustic transmitting device based on a modulated acoustic signal as used in a real-time location system according to example embodiments of the present disclosure.

FIG. 3 illustrates a flowchart diagram of a method of identifying acoustic transmitting device 104 based on modulated acoustic signals 110. Identification method 300 includes the following steps: receive signal (step 301), detect received identifier (step 302), determine valid identifiers at relevant time period (step 303), compare detected identifier to valid identifiers at relevant time period (step 304), match found (decision point 305), and location of mobile device determined (step 306).

In receive signal (step 301), mobile device 106 receives modulated acoustic signals 110, in an embodiment, by using a microphone capable of receiving modulated acoustic signals 110. Modulated acoustic signals include the identifier (possibly encoded identifier information) from the acoustic transmitting device 104 that transmitted modulated acoustic signals 110, which changes according to the period of time. For example, at time $t_1$, the identifier information would reflect one identifier for a particular acoustic transmitting device 104, but at time $t_2$, a different identifier would be reflected in the identifier information.

In detect received identifier (step 302), mobile device 106 detects the identifier from the signals received in receive signal (step 301). In an embodiment, detect received identifier (step 302) occurs on mobile device 106 and its components. In alternate embodiments, a remote computer, such as remote processing server 108 detects the received signals and performs any necessary processing to determine the identifier.

In determine valid identifiers at relevant time period (step 303), identification method 300 retrieves the valid codes from identifier management center 210. In an embodiment, the current time period is compared to the time periods in time-period specific transmitter identification tables 212 to determine the valid identifiers at the specific time period. The valid identifiers represent the one or more instances of acoustic transmitting devices 104 in environment 102.

In compare detected identifier to valid identifiers at relevant time period (step 304), identification method 300 compares the received identifier (from detect received identifier step 302) to the valid identifiers (from determine valid identifiers at relevant time period step 303) in order to determine an identity of the instance of acoustic transmitting device 104 from which acoustic signals 110 were received. In an embodiment, compare detected identifier to valid identifiers at relevant time period (step 304) looks up, retrieves, or otherwise determines an appropriate identifier for an acoustic transmitting device 104 by comparing the detected identifier received in modulated acoustic signals 110 to the list, array, or alternative data structure representing valid identifiers. The detected identifier can be compared using any appropriate means of comparison, e.g., SQL, comparison operators, etc., as one skilled in the arts would understand.

In match found (decision point 305), identification method 300 matches the detected identifier from modulated acoustic signals 110 sent from acoustic transmitting device 104 to predetermined identifiers assigned for use at particular time periods by the acoustic transmitting devices in a location determination system. In location of mobile device determined (step 306), the location of the mobile device 106 is based on the determination of the identifier of acoustic transmitting device 104 based on the detected identifier at the relevant time period of the location determination system. Location determination system 100 uses this detected identifier to determine and report the location of mobile device 106.

Figure 4:
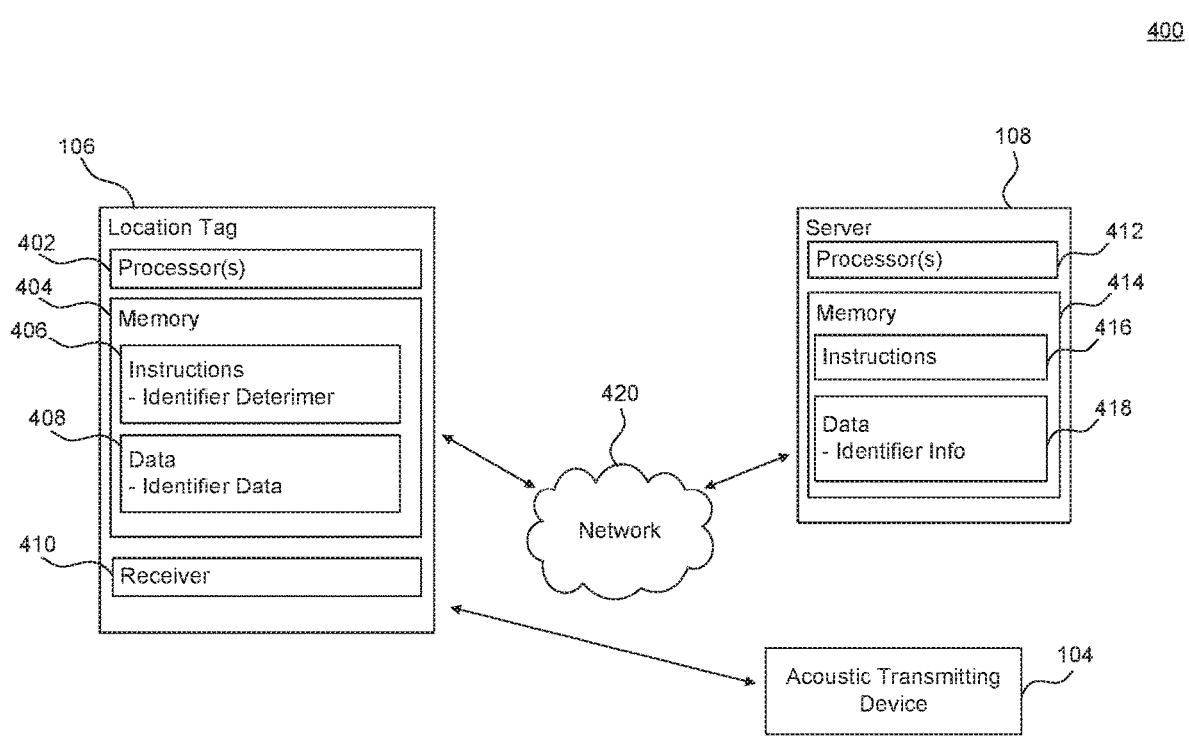
FIG. 4 illustrates an example computing system according to example aspects of the present disclosure.

FIG. 4 depicts an example location system 400 that can be used to implement the methods and systems of the present disclosure. In some implementations, location system 400 is a real-time location system configured to determine the locations of persons and objects. Location system 400 can be implemented using a client-server architecture that includes mobile device 106 that communicates with one or more remote computing devices, such as remote processing server 108. Location system 400 can be implemented using other suitable architectures.

As shown, location system 400 can include a mobile device 106. In an embodiment, mobile device 106 is any suitable type of mobile computing device, such as a smartphone, tablet, cellular telephone, wearable computing device, or any other suitable mobile computing device. In some implementations, mobile device 106 is a dedicated tag (e.g., passive or active) or other device for use in the real-time location system. Mobile device 106 can include one or more processors 402 and one or more memory devices 404.

One or more processors 402 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. One or more memory devices 404 can include one or more computer-readable media, including, but not limited to, non-transitory computer-readable media, RAM, ROM, hard drives, flash memory, or other memory devices.

One or more memory devices 404 can store information accessible by one or more processors 402, including instructions 406 executed by one or more processors 402. For instance, one or more memory devices 404 can store the instructions 406 for implementing one or more modules configured to implement acoustic transmitting device 104, mobile device 106, remote processing server 108, and/or other suitable instructions.

Each of acoustic transmitting device 104, mobile device 106, and remote processing server 108 can include computer logic utilized to provide desired functionality. Thus, each of acoustic transmitting device 104, mobile device 106, remote processing server 108 can be implemented in hardware, application specific circuits, firmware and/or software controlling a general purpose processor. In one embodiment, each of acoustic transmitting device 104, mobile device 106, remote processing server 108 are program code files stored on a storage device, loaded into memory and executed by a processor, or provided from computer program products, for example computer executable instructions stored in a tangible computer-readable storage medium such as RAM, hard disk or optical or magnetic media. Acoustic transmitting device 104, mobile device 106, and remote processing server 108 can each correspond to one or more different programs, files, circuits, or sets of instructions. Likewise, two or more instances of acoustic transmitting device 104, mobile device 106, and remote processing server 108 can be combined into a single program, file, circuit, or set of instructions.

Instructions 406 can further include instructions for implementing a browser, for running a specialized application, or for performing other functions on mobile device 106. For instance, the specialized application can be used to exchange data with remote processing server 108 over the network 420. Instructions 406 can include client-device-readable code for providing and implementing aspects of the present disclosure. For example, instructions 406 can include instructions for implementing an application associated with location determination system 100 or a third party application implementing asset tracking or other services on mobile device 106.

Mobile device 106 can also include data 408 that one or more processors 402 retrieves, manipulates, creates, or stores. Data 408 can include, for instance, identifiers, sequences of codes, random numbers, acoustic model data, sensor data, and/or other data. Mobile device 106 can include various input/output devices for providing and receiving information from a user, such as a touch screen, touch pad, data entry keys, speakers, and/or a microphone suitable for voice recognition. For instance, mobile device 106 can multiple input buttons signifying different events. In an exemplary embodiment, a person in a hospital could press a button to signal distress.

Mobile device 106 can further include receiver 410. Receiver 410 can be any device or circuitry for receiving, listening for, decoding, interpreting or otherwise processing modulated acoustic signals 110 from acoustic transmitting device 104. Mobile device 106 can also include a network interface used to communicate with remote processing server 108 or acoustic transmitting device 104 over network 420. The network interface can include any suitable components for interfacing with one more networks, including for example, transmitters, receivers, ports, controllers, antennas, or other suitable components. Mobile device 106 can further include a communication system used to communicate with acoustic transmitting device 104. The communication system can include, for instance, one or more transducers (e.g. microphone devices) configured to receive acoustic (e.g. ultrasonic) signals from acoustic transmitting device 104.

In some implementations, mobile device 106 can be in communication with a remote computing device, such as remote processing server 108 over network 420. Remote processing server 108 can include one or more computing devices. Remote processing server 108 can include one or more computing devices and can be implemented, for instance, as a parallel or distributed computing system. In particular, multiple computing devices can act together as a single remote processing server 108.

Similar to mobile device 106, remote processing server 108 can include one or more processors 412 and memory 414. One or more processors 412 can include one or more central processing units (CPUs) and/or other processing devices. Memory 414 can include one or more computer-readable media and store information accessible by one or more processors 412, including instructions 416 that can be executed by one or more processors 412 and data 418.

Data 418 can be stored in one or more databases. The data can include identifier information, acoustic model data, and other data required by location determination system 100. One or more databases can be connected to remote processing server 108 by a high bandwidth LAN or WAN or can also be connected to remote processing server 108 through network 420. The one or more databases can be split up and reside in distributed or multiple locales.

Remote processing server 108 can also include a network interface used to communicate with mobile device 106 and acoustic transmitting device 104 over network 420. The network interface can include any suitable components for interfacing with one more networks, including for example, transmitters, receivers, ports, controllers, antennas, or other suitable components.

Network 420 can be any type of communications network, such as a local area network (e.g. intranet), wide area network (e.g. Internet), cellular network, or some combination thereof. Network 420 can also include direct connections between acoustic transmitting device 104, mobile device 106, and remote processing server 108. Network 420 can include any number of wired or wireless links and instrumented using any suitable communication protocol.

Location system 400 can further include one or more instances of acoustic transmitting device 104. Acoustic transmitting device 104 can transmit acoustic signals (e.g. ultrasonic signals) as described in FIG. 1. In some implementations, acoustic transmitting device 104 can transmit other suitable signals, such as radio frequency signals. Acoustic transmitting device 104 can be implemented using any suitable computing devices. Acoustic transmitting device 104 can include one or more transducers configured to emit acoustic or other suitable signals that mobile device 106 uses to derive a location. Although FIG. 4 depicts only one acoustic transmitting device 104 and mobile device 106 it will be appreciated by those skilled in the art that any suitable number of these devices can be included in location system 400.

It is to be appreciated that the Detailed Description section, and not the Summary and Abstract sections, should be used to interpret the claims. The Summary and Abstract sections may set forth one or more but not all exemplary embodiments of the present invention, and thus, should not limit the present invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A computer-implemented method, comprising:
   receiving, at a first time, an acoustic signal by a mobile device in a real-time location system in an environment, the acoustic signal having been transmitted by an acoustic transmitting device located in the environment, the acoustic transmitting device being one of M acoustic transmitting devices in the environment;
   detecting, by the mobile device, an identifier from the received acoustic signal, wherein the detected identifier is a member of a rotating set of identifiers provided by the real-time location system, the rotating set of identifiers having N unique identifiers, and M exceeds N, wherein the identifier is provided to the acoustic transmitting device by the real-time location system for transmission by the acoustic transmitting device during a first time period of validity of the identifier, the first time period of validity being set based on at least a maximum acoustic range, and wherein the first time falls within the first time period of validity;
   determining a location of the mobile device based on the detected identifier, the first time, a location of the acoustic transmitting device and the first time period of validity;
   receiving, at a second time, a second acoustic signal by a second mobile device in the real-time location system in the environment, the second acoustic signal having been transmitted by a second acoustic transmitting device located in the environment;
   detecting, by the second mobile device, the identifier from the received second acoustic signal, wherein the identifier is provided to the second acoustic transmitting device by the real-time location system for transmission by the second acoustic transmitting device during a second time period of validity, wherein the second time period of validity and the first time period of validity do not overlap, and wherein the second time falls within the second time period of validity; and
   determining a location of the second mobile device based on the detected identifier, the second time, a location of the second acoustic transmitting device and the second time period of validity.

2. The method of claim 1, wherein the acoustic signal is an ultrasonic signal.

3. The method of claim 1, wherein the determining the location of the mobile device is further based on an RF access point to which the mobile device is communicatively coupled.

4. The method of claim 1, wherein the environment is a hospital.

5. The method of claim 1, wherein determining the location of the mobile device comprises:
comparing the detected identifier with pre-determined identifiers that are valid for the first time period of validity, the pre-determined identifiers being stored within a predefined table, and wherein an identifier of the pre-determined identifiers that matches the detected identifier is associated with the acoustic transmitting device.

6. The method of claim 1, further comprising:
transmitting, by the mobile device, the detected identifier of the acoustic transmitting device, via a wireless local area network to a central server in the real-time location system.

7. A computer-implemented method, comprising:
determining a rotating set of identifiers associated with a real-time location system in an environment, the rotating set of identifiers having N unique identifiers;
providing a first time period of validity for association of a first acoustic transmitting device with one identifier of the rotating set, and providing a second time period of validity for association of a second acoustic transmitting device with the one identifier of the rotating set, wherein the first time period of validity and the second time period of validity are different, wherein the first acoustic transmitting device and the second acoustic transmitting device are each one of M acoustic transmitting devices in the environment, M exceeds N, and the first time period of invalidity and the second time period of invalidity are each set based on at least a maximum acoustic range;
modulating, by the first acoustic transmitting device, a first acoustic signal with the one identifier to output a first modulated acoustic signal;
transmitting, by the first acoustic transmitting device, the first modulated acoustic signal during the first time period of validity to a first mobile device located within the environment;
modulating, by the second acoustic transmitting device, a second acoustic signal with the one identifier to output a second modulated signal; and
transmitting, by the second acoustic transmitting device, the second modulated acoustic signal during the second time period of validity to a second mobile device located within the environment.

8. The method of claim 7, wherein the first modulated acoustic signal is an ultrasonic signal.

9. The method of claim 7, wherein each respective time period of validity for each identifier is within a range of 3 seconds and 300 seconds.

10. The method of claim 7, wherein the environment is a hospital.

11. The method of claim 7, wherein determining the rotating set of identifiers comprises:
generating the rotating set of identifiers using a pseudo-random number generator and a seed value.

12. The method of claim 7, wherein determining the rotating set of identifiers comprises:
selecting the rotating set of identifiers from a pre-defined table of identifiers that associates the selected rotating set of identifiers with the first acoustic transmitting device and the second acoustic transmitting device and respective time periods of validity.

13. A computer-implemented system, comprising:
a server device configured to:
determine a rotating set of identifiers associated for a real-time location system in an environment, the rotating set of identifiers having N unique identifiers, wherein one identifier of the rotating set of identifiers is assigned a first time period of validity for association with the first acoustic transmitting device, and the one identifier is assigned a second time period of validity for association with the second acoustic transmitting device, wherein the first acoustic transmitting device and the second acoustic transmitting device are each one of M acoustic transmitting devices in the environment, M exceeds N, and the first time period of validity and the second time period of validity are each set based on at least a maximum acoustic range;
the first acoustic transmitting device configured to:
modulate a first acoustic signal with the one identifier from the rotating set of identifiers to output a first modulated acoustic signal and transmit the first modulated acoustic signal to a mobile device;
the second acoustic transmitting device configured to:
modulate a second acoustic signal with the one identifier from the rotating set of identifiers to output a second modulated acoustic signal and transmit the second modulated acoustic signal to another mobile device; and
the mobile device, configured to:
receive, during the first time period of validity, the first modulated acoustic signal;
detect the one identifier from the received first modulated acoustic signal; and
determine a location of the mobile device based on the detected one identifier, a location of the first acoustic transmitting device and the first time period of validity.

14. The system of claim 13, wherein the first modulated acoustic signal is an ultrasonic signal.

15. The system of claim 13, wherein the determining the location of the mobile device is further based on the detected one identifier, the first time period of validity and an RF access point to which the mobile device is communicatively coupled.

16. The system of claim 13, wherein the server device is further configured to:
determine the rotating set of identifiers using a pseudo-random number generator and a seed value.

17. The system of claim 13, wherein the server device is further configured to:
determine the rotating set of identifiers using a predefined table that associates each identifier of the rotating set of identifiers with a respective acoustic transmitting device for the respective time period of validity.

18. The system of claim 13, wherein the mobile device is further configured to:
compare the detected one identifier with identifiers stored within a predefined table, the predefined table associating the one identifier with the first acoustic transmitting device for the first time period of validity.

19. The system of claim 13, wherein the mobile device is further configured to:

transmit the location of the mobile device via a wireless local area network to the server device in the real-time location system.

20. A mobile device, comprising:

an acoustic receiver configured to receive a modulated acoustic signal, wherein the modulated acoustic signal includes an identifier, the identifier being one of a rotating set of identifiers having N unique identifiers, the identifier having an association with an acoustic transmitting device for a time period of validity and the identifier having no association with the acoustic transmitting device outside the time period of validity, the acoustic transmitting device being one of M acoustic transmitting devices in an environment, M exceeds N, and the time period of validity is set based on at least a maximum acoustic range; and a processor configured to:

detect, during the time period of validity, the identifier from the received modulated acoustic signal; and determine a location of the mobile device based on the identifier, a location of the acoustic transmitting device, and the time period of validity.

\* \* \* \* \*